(12) United States Patent
Jacobson

(10) Patent No.: US 9,718,510 B2
(45) Date of Patent: Aug. 1, 2017

(54) WATER BOTTLE AND CAGE SYSTEM FOR BICYCLES

(71) Applicant: Saul D. Jacobson, Brooklyn, NY (US)

(72) Inventor: Saul D. Jacobson, Brooklyn, NY (US)

( * ) Notice: Subject to any disclaimer, the term of this patent is extended or adjusted under 35 U.S.C. 154(b) by 0 days.

(21) Appl. No.: 14/797,132

(22) Filed: Jul. 12, 2015

(65) Prior Publication Data
US 2016/0009328 A1   Jan. 14, 2016

Related U.S. Application Data

(60) Provisional application No. 62/024,464, filed on Jul. 14, 2014.

(51) Int. Cl.
B62J 11/00 (2006.01)

(52) U.S. Cl.
CPC ................... B62J 11/00 (2013.01)

(58) Field of Classification Search
USPC ......... 224/414, 926; D12/407, 411; 215/260, 215/224, 3; 220/788
See application file for complete search history.

(56) References Cited

U.S. PATENT DOCUMENTS

| | | | |
|---|---|---|---|
| 3,871,662 A * | 3/1975 | Hepp | B65D 50/061 215/206 |
| 4,437,596 A * | 3/1984 | Shook | B62J 11/00 224/414 |
| D455,707 S | 4/2002 | Sartore | |
| D738,286 S * | 9/2015 | Lombard | D12/411 |
| 2007/0062973 A1* | 3/2007 | Sochacki | B65D 23/08 222/175 |
| 2010/0264184 A1* | 10/2010 | Retief | B62J 11/00 224/427 |
| 2011/0042435 A1* | 2/2011 | Weng | B62J 11/00 224/414 |

FOREIGN PATENT DOCUMENTS

TW  DE 202008011446 U1 * 10/2008 ............. B62J 11/00

\* cited by examiner

*Primary Examiner* — Nathan J Newhouse
*Assistant Examiner* — Scott McNurlen
(74) *Attorney, Agent, or Firm* — Kevin E. Remus

(57) ABSTRACT

An apparatus is provided to reduce the aerodynamic drag of bicycle frame mounted water bottle and cage systems. Furthermore, the apparatus also improves the safety of bicycle water bottle and cage systems. In an exemplary embodiment, a cage and bottle are provided. The cage is formed with a plurality of hemispheres which can spread apart in order to receive bottles of various diameters. The bottle is longer and thinner than bottles in use today and is formed with dimples on the entirety of its surface. The cap provided with the bottle has minimal threading and is formed with breaks in the threading to allow for the top to be ejected when dropped.

17 Claims, 4 Drawing Sheets

WATER BOTTLE AND CAGE SYSTEM FOR BICYCLES

This application claims the benefit of U.S. Provisional Patent Application Ser. No. 62/024,464 tiled Jul. 14, 2014.

TECHNICAL FIELD

The technical field pertains to apparatuses and methods for use in cycling, and more particularly pertains to apparatuses and methods for mounting water bottles and water bottle cage systems to the frame of a bicycle.

BACKGROUND

Cycling as both a competitive and a recreational endeavor continues to increase in popularity. Both competitive and recreational cyclists continuously seek ways to improve their performance. In addition to seeking this competitive edge, cyclists also continuously seek ways to improve the safety of the sport.

One way in which cyclists increase performance is to carefully study the aerodynamics of their equipment. This is generally accomplished in one of two ways: either improving the aerodynamics of (1) the bicycle and any apparatus attached thereto or (2) the equipment worn by the cyclist.

In the last few decades, nearly every aspect of modern bicycle design has undergone significant changes. Significantly, one area that has not undergone significant design changes has been the frame mounted water bottle and cage system. Interestingly, this system is a source of significant aerodynamic drag because of: (1) the discrepancy between the diameter of the bicycle frame tube and the water bottles and cages and (2) air eddies and turbulence that form at the juncture between the frame tube of a bicycle and the cage assembly as currently configured. Current designs of water bottles and cage systems are designed such that the diameter of the system (either just the bottle or the bottle engaged with the cage) extends beyond the width of the frame. This is true because of a nearly industry-wide standardization of diameters for frame-mounted water bottles. In addition, most water bottles sits at least 1.5 centimeters away from the frame tubes, referred to herein as a stack height, on which the bottle is placed because of the use of bolts that secure the cage body to the frame. Distances greater than 1.5 centimeters can also result if some type of battery is also placed between the frame and the cage body. A 1.5 centimeter distance is enough to cause air eddies and turbulence, and the larger this distance, the greater the aerodynamic drag.

Safety is another reason for improvements in the equipment used by both competitive and recreational cyclists. One particular area of concern for riders that demands more attention in the realm of safety is when water bottles are inadvertently dropped. This can be a common occurrence because cyclists are usually attempting to insert a water bottle into an aperture with a nearly identical diameter as the bottle. This is also done when a rider is moving at a high rate of speed and is done without the benefit of being able to see the cage into which the bottle needs to be inserted. Current designs allow for very limited adjustments of the cage along the downtube or the seat tube, which leads to increased difficulty for inserting the water bottle into its cage for riders who have an above average or below average reach. Another issue with the current designs of water bottles is that the diameter and smooth surface of the bottle are difficult to handle. The standard diameter of the bottle simply does not fit comfortably with the human hand, and the smooth plastic used in the construction of most bottles can easily slip from a rider's grasp. All of these factors increase the probability of a bottle being dropped inadvertently.

Whether a group of riders is riding competitively or for recreation, riders usually ride in tight formations. In this configuration, when a water battle is dropped, it becomes extremely dangerous to other riders who are unable to see the bottle until the rider is right on top of it. A dropped water bottle will also likely ricochet or bounce through the formation causing riders to fall or to collide with one another.

Groups of riders will often use one rider to carry water to the rest of the team. This is accomplished by having a designated rider break away from the group and secure several water bottles for his teammates. Using current water bottle designs, this designated rider can generally carry three extra bottles at a time safely in the designated rider's jersey. This means that the designated rider must make multiple trips back and forth between a support vehicle and his teammates. Thinner, longer bottles are also easier to hand of between riders and support personnel, who are either in vehicles or standing on the road. Between the designated rider having to ride back and forth and having to hand water bottles to his teammates who are moving, it is easy to see why minimizing this risk-filled activity would increase safety.

Current water bottles that are designed to eject their cap when hit by a bicycle tire are extremely unreliable. The current designs have been unsuccessful in accomplishing the task of having a lid fall off under pressure, while at the same time not allowing water to leak or escape when the cap is engaged with the bottle.

In light of the above, it is desirable to provide a water bottle and cage mounting system that minimizes the aerodynamic drag on the bicycle. It is also desirable to provide a water bottle and cage mounting system that increases safety in the sport of cycling by minimizing the number of accidents caused by dropped water bottles, and reducing the danger of bottles once they are dropped. Furthermore, it is desirable to provide a water bottle and cage mounting system that is easy to use, is simple to manufacture and is comparatively cost effective.

SUMMARY

In accordance with an exemplary embodiment, an apparatus for securing a water bottle to the frame of a bicycle is provided as is a water bottle designed to fit snugly into the apparatus. A cage is provided that includes several essential components. First, the main cage body is provided and is constructed of some type of carbon fiber, plastic, or metal, but the cage may also be constructed of plastic or any other material commonly used in the pertinent art. As the name suggests, the cage is a boxlike series of wires that run parallel to each other and extend away from the base plate of the cage. Although a cage is contemplated here, other embodiments can also be used, such as interlocking wires or a solid piece of plastic or carbon fibers. No matter which material is chosen, a reflective coating, reflective stickers, or other reflective material can be incorporated into the material or added separately. In any case, the cage will be a split hemisphere type design, with two distinct hemispheres being utilized in most cases. The split hemisphere design will allow the cage to expand to receive bottles of different diameters through an opening or aperture. To accomplish the split hemisphere design, the cage is formed with a lengthwise opening that can extend for the length of the cage or for a portion of the length of the cage. The cage is split and the two hemispheres may be in contact with one another when no bottle is in the cage. When a bottle is inserted, the cage stretches to receive a bottle. This feature allows for the insertion of bottles of varying diameters. Different designs can be used to accommodate multiple size and diameter bottles. For instance, a particular split hemisphere design may accommodate battles as small as 64 millimeters and as large as 73 millimeters. To accommodate various size bottles, it is necessary that the cage have an angled entry to the aperture that is sufficiently wide enough along that angle to allow a 73 millimeter bottle to be placed into the cage without significantly greater force than a smaller bottle.

The base plate of the cage extends in either direction away from the main cage body. Further, the base plate of the cage is formed with two oval-shaped apertures to allow for the insertion of screws that serve to join the cage to the frame of a bicycle. It should be noted that any number of oval-shaped apertures may be formed into the base plate of the cage. In order to improve the joining of the water bottle and the cage, the base plate of the cage can be formed with any number of retaining or centering ridges that extend from one end of the base to the other. These ridges project along the base of the body of the cage and flair outwards at various angles in order to prevent water bottles from slipping out or being improperly aligned in the cage. These ridges assist in securing the water bottle in place and also assist in guiding the bottle into place when a rider is placing the bottle back into the cage, which is especially important when the rider cannot see what he or she is trying to accomplish. In an alternate embodiment, a channel for accommodating battery packs, or other equipment, can be formed on the underside of the base plate between the base plate and the bicycle frame.

The other two essential components of the cage are the lip and the heel. Structurally, the heel is formed as an extension off of the body and is made of the same material as the body. At its distal end the heel is formed with a toe that extends in the direction of the base plate. This toe is configured to catch the water bottle, or to create contact between the base plate of the water bottle and the toe to secure it in place and prevent its movement past the toe. The lip of the cage is formed as a narrow extension that extends from the base plate in a direction away from the base plate. This lip is designed to engage the neck of the water bottle to secure the water bottle in place. In alternate embodiments, the lip can be formed in a way to allow either the lip or the heel to be adjusted in a direction parallel to the bike frame. The purpose of doing so would allow the cage to receive bottles of varying lengths if necessary and to possibly adjust the location of the cage and the water bottle so that neither the cage nor the water bottle interfere with other parts of the bicycle. Both the Hp and the heel can also be constructed in a split hemisphere manner in order to allow for the apparatus to receive water bottles of various diameters.

When the split hemisphere design is used, the cage has split left and right hemispheres that only connect to one another along the base plate of a single piece construction. When split toe tabs are used to form the heel, the heel can project off of either the upper portion of the cage or the lower portion of the cage. With either split hemispheres or split toe tabs, two hemispheres or tabs are used in a preferred embodiment. In other embodiments, more hemispheres or toe tabs can be constructed. Split toe tabs will overlap when no water bottle is in the cage, and each hemisphere will have its own toe tab. This will allow the cage to flex outward to accommodate various sizes of water bottles up to 73 millimeters, and possibly even diameters larger than 73 millimeters.

The cage can also be formed in such a manner that will minimize frontal surface area. This is accomplished by angling the upper receiver or hemispheres of the cage so that the leading edge interaction with air is minimized. Another way to describe this would be to have the aperture angled in such as manner so the leading edge of the aperture of the upper receiver lies as close to level and parallel to the ground as possible.

In order to secure the cage to the frame of a bicycle, two or more screws are provided. In an exemplary embodiment, the base plate of the cage matches the shape of the bicycle frame to produce a snug fit between the base plate and the cage. In an alternate embodiment, an adapter plate can be used to join the base to the frame. It is noted that the cage can be secured to the frame of a bicycle with or without an adapter plate. In either the case of the base plate of the cage being attached directly to the frame or the base plate of the cage being attached to the frame using an adapter plate, a snug fit between the cage and the frame of the bicycle will result. When the adapter plate is used, the adapter plate is positioned between the base plate and the frame to create for a snug fit between the base and the frame by compensating for the difference in shape between the base plate and the bicycle frame. The snug fit would also minimize the distance between the frame and the cage, which then minimizes the possibility of eddies and turbulence caused when space exists between the bottle and the frame tube to which the cage is attached. In either case, the cage is attached to the frame of the bicycle using several lie flat or flat head type screws that would be flush with the surface of the base to improve the aerodynamics of the apparatus. The oval shape of the apertures of the base allow for customization of the location of the cage on the frame of the bicycle. This customization is based on the characteristics of the individual rider who will secure the cage at a location that optimally matches up with the rider's reach. In order to dissipate some of the friction caused by tightening the screws, a friction strip can be utilized. Frame protection adhesive stickers can also be used to protect the frame from damage caused by tightening the screws.

An improved water bottle is also provided as part of the exemplary embodiment. This water bottle is narrower than the standard 73 mm diameter water bottles commonly used in the pertinent art. Ideally, in order to accommodate the same volume of water without lengthening the bottle too significantly, the diameter of the water bottle would be 65 mm or 66 mm. By narrowing the water bottle, the water bottle will be longer than the standard bottle in order to carry the same volume of water. Additional improvements to the water bottle will be the addition of some type of structural modification that will improve the grip of the rider and allow for easier manipulation and movement of the bottle from the cage and into the rider's hand. As contemplated, this structural modification will take the form of a series of indented dimples that cover a significant amount of surface area on the bottle.

A further structural feature of the improved water bottle is to provide a minimal amount of threading than is commonly found in current versions of pop-off top type water bottles. In addition to using less threading, an exemplary embodiment would also modify the traditional threading design by providing breaks in the threading at an angle of approximately 120 degrees to also increase the likelihood of the top of the water bottle popping off when it is run over by a bicycle.

When the cage is positioned onto the tube of the bicycle frame, it is important for aerodynamic purposes that the upper edge of the cage is positioned parallel to the ground. In doing so, aerodynamic advantages are realized.

BRIEF DESCRIPTION OF DRAWINGS

FIG. 3 also shows novel characteristics of the water bottle for the improved water bottle.

DETAILED DESCRIPTION

Figure 1A:
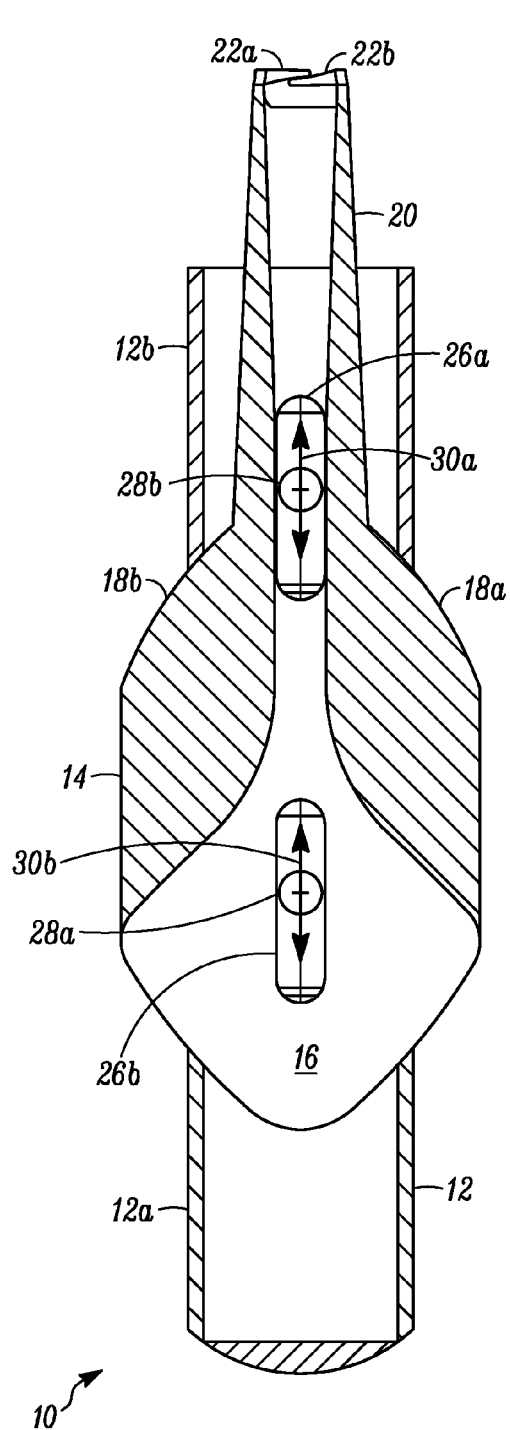
FIG. 1A shows a top view of the cage.

Referring first to FIG. 1A, a plan view of the cage 10 is shown. The cage 10 is formed with a base plate 12 having an upper end 12a and a lower end 12b that is used to secure the cage 10 to the frame 14 (not shown in FIG. 1) of a bicycle. Structurally, the cage 10 is formed with an upper receiver 16 split into two hemispheres 18a, 18b and a cage heel 20. By using two hemispheres 18a, 18b, the cage 10 can expand to receive objects of various diameters. In further detail, the cage heel 20 is formed with two heel tabs 22a, 22b. As shown in FIG. 1A, the two toe tabs 22a, 22b overlap with one another when in a first position where no bottle 24 (not shown in FIG. 1) is in the cage 10. When a bottle 24 is placed into the cage 10, the bottle 24 extends through the upper receiver 16 and contacts the toe tabs 22a, 22b. Based on the diameter of the bottle 24, the toe tabs 22a, 22b move into a second position where the toe tabs 22a, 22b are no longer overlapping. In either the first or second position, the toe tabs 22a, 22b are in contact with the bottle 24 to secure the bottle 24 into the cage 10.

Still referring to FIG. 1A, it can be seen that the cage 10 is formed with a plurality of bolt hole channels 26a, 26b, in this case two bolt hole channels 26a, 26b. These bolt hole channels 26a, 26b are oval in shape in a preferred embodiment as shown. The bolt hole channels 26a, 26b extend from the cage 10 in the direction of the bicycle frame 14 through the cage 10 and the base plate 12. Bolts 28a, 28b pass through the bolt hole channels 26a, 26b and through the base plate 12 and into the bicycle frame 14. These bolts 28a, 28b are lie-flat type bolts 28a, 28b that are flush with the surface of the cage 10 in order to cut down on aerodynamic drag. The shape of the bolt hole channels 26a, 26b allow the cage 10 to move in an upward or downward direction as indicated by directional arrows 30a, 30b prior to tightening the bolts 25a, 28b. Alternatively, the bolts 28a, 28b can be loosened at any time to adjust the location of the cage 10 on the bicycle frame 14.

Figure 1B:
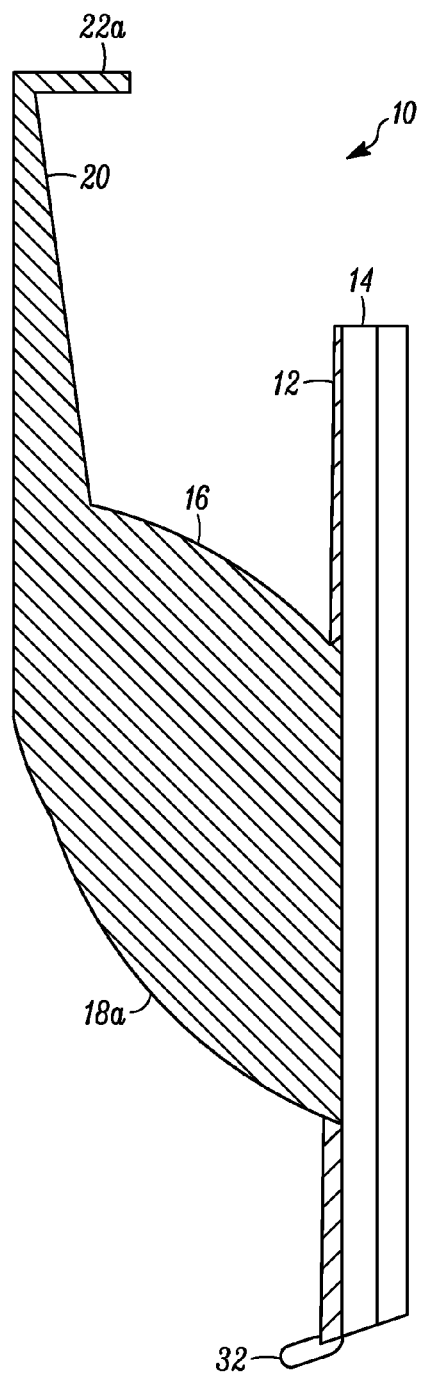
FIG. 1B shows a side-view of the cage.

Referring now to FIG. 1B, a side view of the cage 10 is shown. The base plate 12 is shown connected to the frame 14 of a bicycle, in other embodiments, the base plate 12 can be formed in a "v" or foil type shape to be secured to a bicycle frame 14 with a complementary shape. The other structural components of the cage 10 that are shown are one hemisphere 18a of the upper receiver 16 and the cage heel 20 with a toe tab 22a. It can be seen in FIG. 1B that the upper receiver 16, cage heel 20, and toe tab 22a are formed as a solid piece of the same material to form the cage 10. In a preferred embodiment, the material used to form the cage 10 is a lightweight carbon fiber. Other options for materials can be metal or plastic. Whichever material is used can be formed with a reflective coating to promote greater visibility of the bicycle. An additional structural feature shown in FIG. 1B is the lip 32. This lip 32 is formed at the upper end of the cage 10. The purpose of the lip 32 is to interact with an indentation in the bottle 24 in order to further secure the bottle 24 in the cage 10. The lip 32 extends away from the base plate 12 at an angle.

Figures 2A, 2B, 2C:
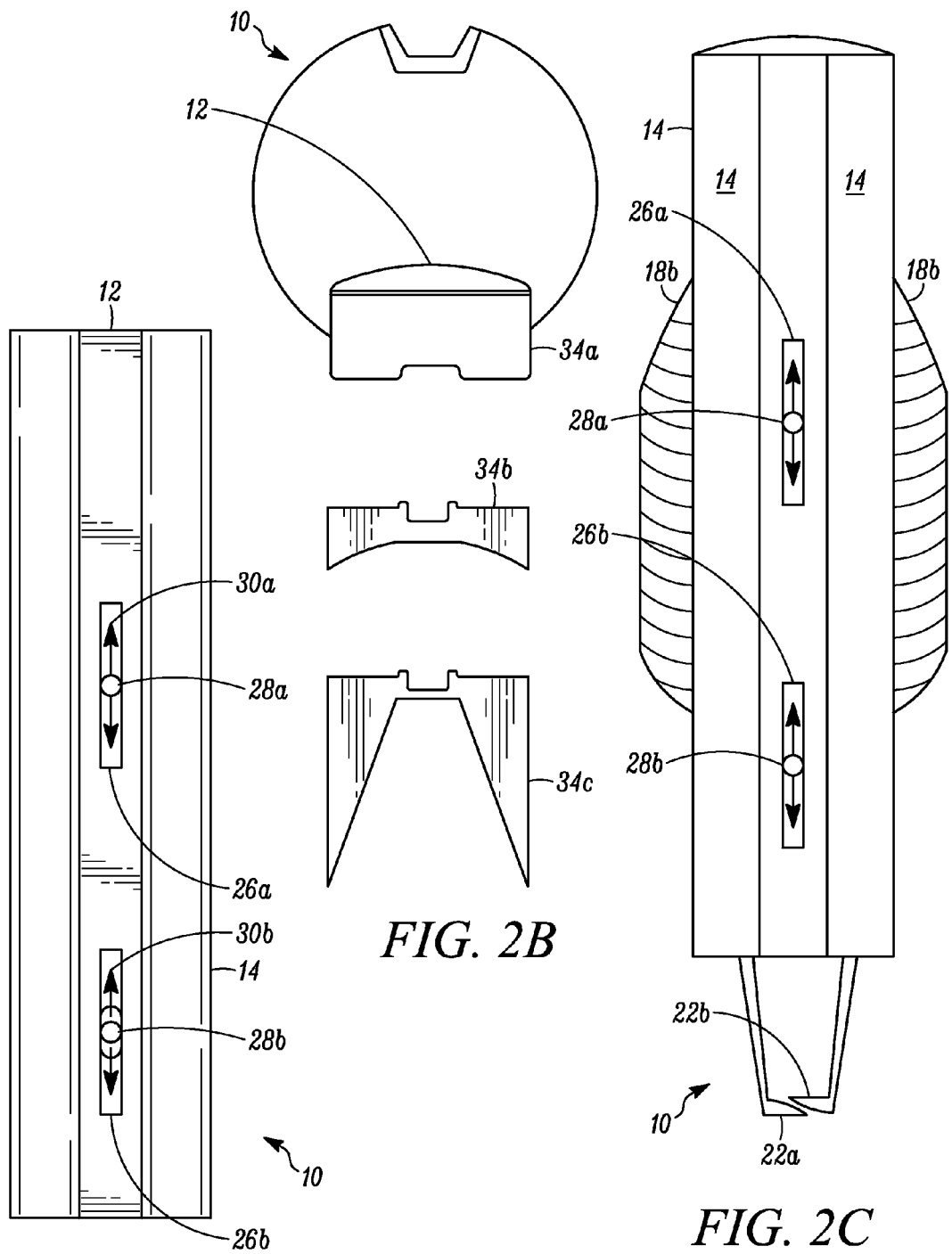
FIG. 2A shows a top view of the base plate attached to a bicycle frame.
FIG. 2B shows various embodiments of adapter plates and how the adapter plate can be used to secure the base to the frame of a bicycle.
FIG. 2C shows a view of the cage secured to a bicycle frame.

Now referring to FIG. 2A, a view of the base plate 12 is shown secured to the bicycle frame 14. As shown, the base plate 12 is secured to the frame 14 by inserting the two bolts 28a, 28b into the bolt hole channels 26a, 26b. Again, these bolt hole channels 26a, 26b are formed to allow movement of the cage 10 in the direction shown by the directional arrows 30a, 30b.

In FIG. 2B, adapter plates 34a, 34b, 34c are shown. These adapter plates 34a, 34b, 34c, can be customized to any shape in order to fit a particular bicycle frame 14. The purpose of the adapter plates 34a, 34b, 34c is to secure a flat base plate 12 of the cage 10 to a bicycle frame 14 that is not flat-shaped. These adapter plates 34a, 34b, 34c can be a standard shape 34a, a round shape 34b, or a foil shape 34c depending on the type of bicycle frame 14 to which the cage 10 is secured. Furthermore, an adapter plate 34 can be constructed to match any bicycle frame 14 shape. Another important aspect of connecting the cage 10 to the frame 14 is the interaction of the base plate 12 and the adapter plate 34a. It can be seen that the cage 10 is secured to the frame 14 by securing the base plate 12 to the adapter plate 34a. Adapter plates 34a, 34b, 34c are not required if the cage 10 is formed with a base plate 12 that is formed in a "v" shape or a foil shape that can be secured directly to the frame 14 of the bicycle.

Figure 3:
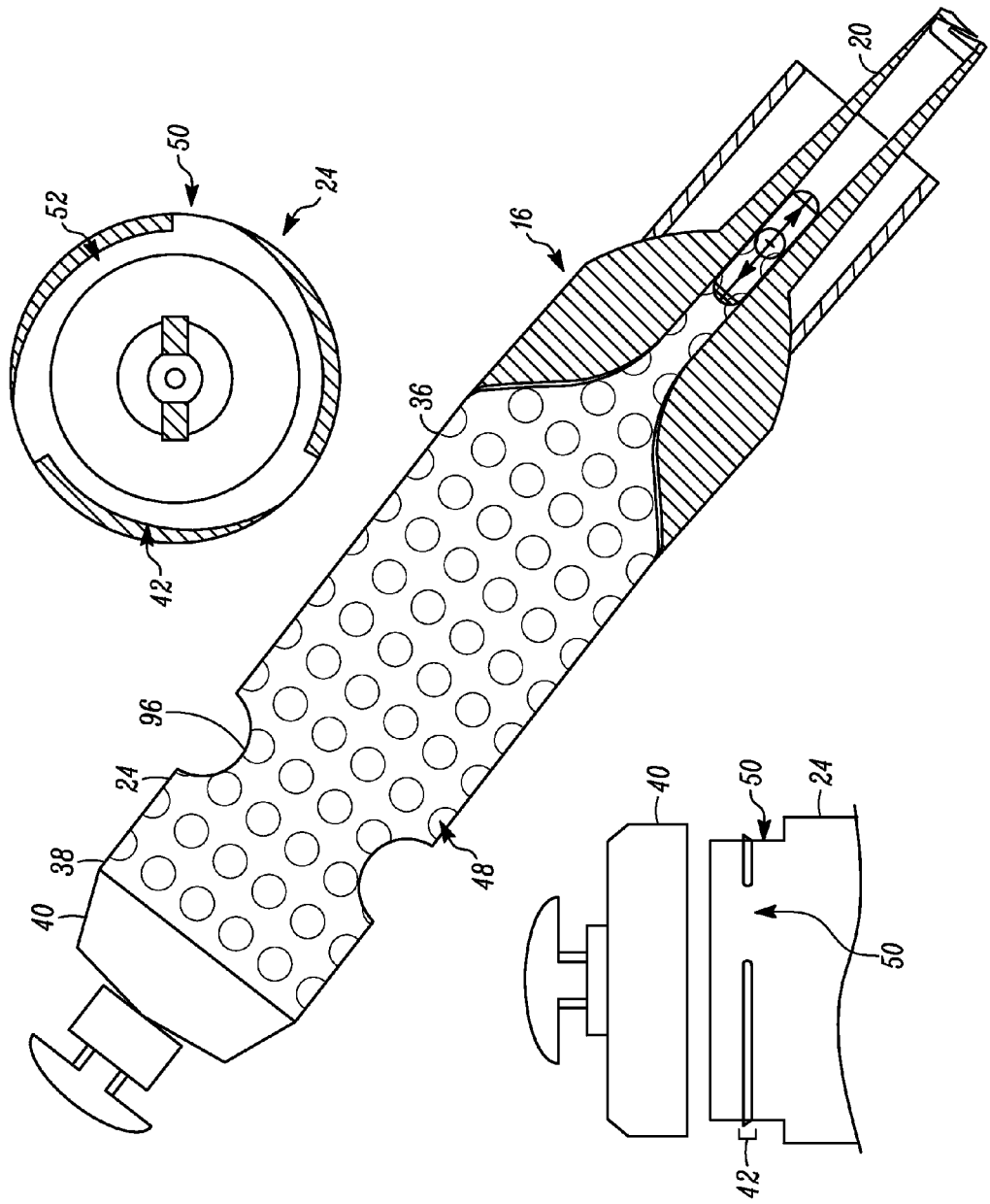
FIG. 3 shows details of the cage with a bottle inserted into the cage.

Referring now to FIG. 2C, a view of the cage 10 is shown secured to the frame 14 of the bicycle. Here, the adapter plate 34 can be seen interacting with the base plate 12 to secure the cage 10 to the frame 14 through the bolts 28a, 28b that are tightened in the bolt hole channels 26a, 26b. Both hemispheres 18a, 18b of the upper receiver 16 can be seen as can the toe tabs 22a, 22b and the cage heel 20. It should be noted that no bottle 24 is in the cage 10, so the toe tabs 22a, 22b are in the overlapping position described previously.

in FIG. 3, details of a bottle 24 are shown. The bottle 24 has a first end 36 and a second end 38. The first end 36 of the bottle 24 is inserted into the upper receiver 16 of the cage 10, and the second end 38 is the upper part of the bottle 24 that extends away from the cage heel 20 and towards the rider of a bicycle. The bottle 24 is formed with a diameter "D" that is 73 millimeters or less. This is a narrower diameter than bottles currently in use in cycling today. In order to close the bottle 24, a cap 40 is formed and is mated with the bottle 24. An important characteristic of the cap 40 is the use of a single thread 42 that fits into a corresponding groove 44 on the bottle 24. A further structural characteristic of the bottle 24 is a neck 46, which is formed on the bottle 24 on the second end 38. This neck 46 is formed as an indentation, meaning a part of the bottle 24 with a diameter narrower than the other parts of the bottle 24, which makes the bottle 24 easier to grasp when a rider is on the bicycle and reaches for the bottle 24. An additional reason for the neck 46 being indented is that the lip 32 of the cage 10 contacts the neck 46 in order to further secure the bottle 24 in the cage 10. One other feature of the bottle 24 shown in FIG. 3 is a plurality of dimples 48. These dimples 48 are envisioned to cover the entire surface of the bottle 24 in order to improve tactile feedback when a rider reaches for a bottle 24, and the dimples 48 also mitigate turbulence on the bottle 24. A depth of approximately 0.1 millimeters would be used in a preferred embodiment of the dimples 48. A final feature illustrated in FIG. 3 is a break 50 in the thread 42. With the thread 42 and the break 50, an overlap 52 may be present and is illustrated in FIG. 3 as well.

Figure 4:
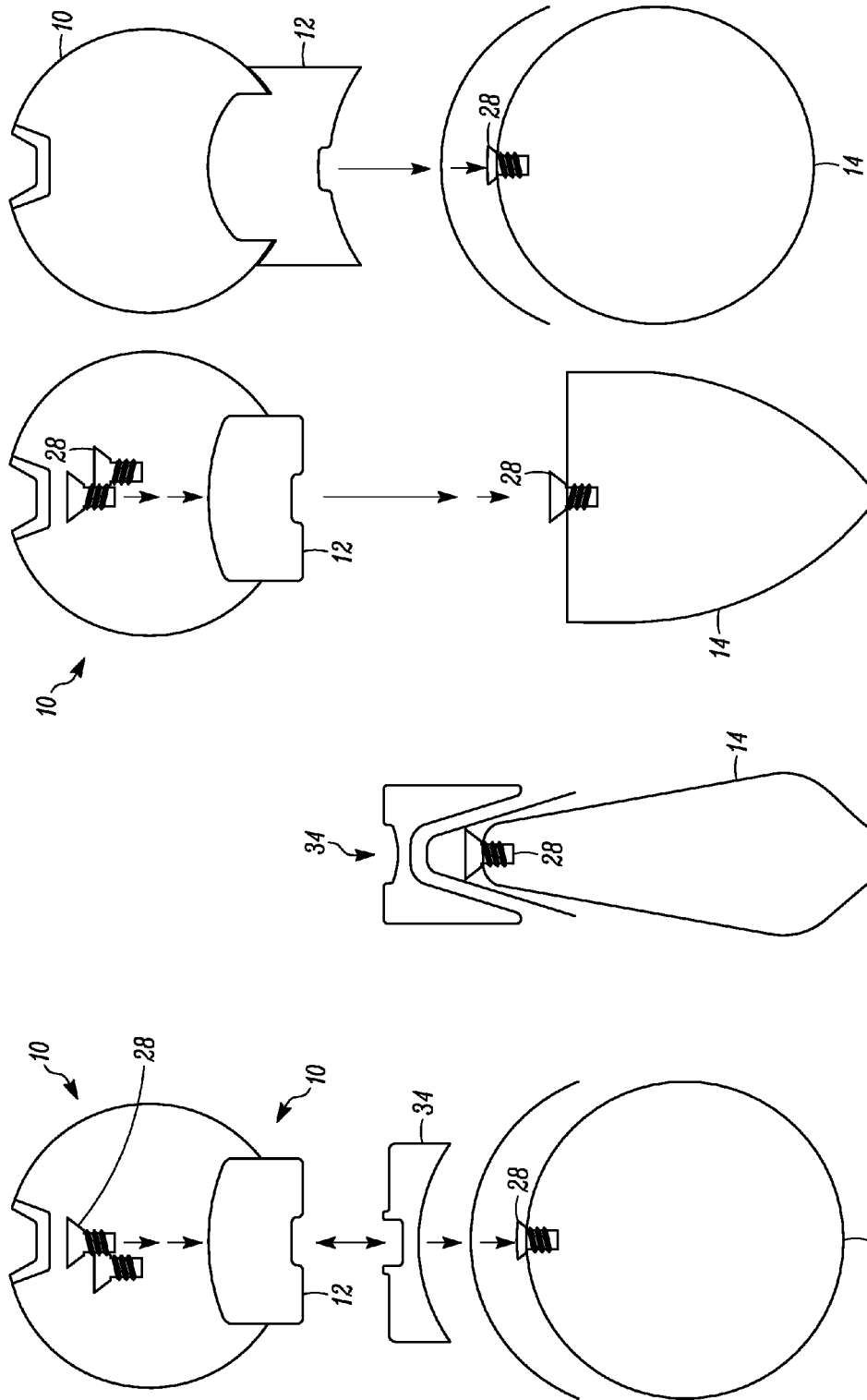
FIG. 4 shows various details for using the flat-head type screws to connect the cage to a bicycle.

FIG. 4 shows further detail of the interaction of the cage 10, the bolts 28a, 28b, the base plate 12, and the adapter plate 34. The structural cooperation of these components allow the cage 10 to be secured to a variety of different styles of bike frames 14.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the claimed subject matter in any way. Various changes may be made in the function and arrangement of elements described in an exemplary embodiment without departing from the scope set forth in the appended claims.

What is claimed is:

1. An apparatus for use with a bicycle frame, wherein the apparatus comprises:
    a cage having a length, wherein the cage is formed with a base plate extending the length of the cage, wherein the base plate has an upper end and a lower end, wherein the cage is formed from a series of wires that run parallel to each other, and wherein the series of wires extend away from the base plate;
    an upper receiver, wherein the upper receiver is connected to the base plate and extends in a direction away from the base plate, wherein the upper receiver is formed with a plurality of hemispheres;
    a cage heel having a proximal and a distal end, wherein the cage heel is formed on the upper receiver, and wherein the cage heel has a plurality of toe tabs at the distal end of the upper receiver;
    a lip extending away from the upper end of the base plate;
    a plurality of bolt hole channels, wherein the bolt hole channels are formed on the base plate to receive a plurality of bolts to secure the cage to the bicycle frame; and
    a bottle, wherein the bottle has a diameter "D" of 64-73 millimeters, a height "h," a first end for insertion into the upper receiver and a second end formed with an indentation having a diameter less than "D," wherein the first end contacts the cage heel and the second end is secured to the cage by the lip;
    wherein with the bottle not inserted into the apparatus, at least one toe tab overlaps at least one other toe tab and, with the bottle inserted into the apparatus, the at least one toe tab does not overlap the at least one other toe tab.

2. An apparatus as recited in claim 1 wherein the bolts have a head end and a tail end, wherein the tail end is inserted into the bicycle frame and the head end has a flat head that lies flush with the base plate when engaged with the bolt hole channel.

3. An apparatus as recited in claim 1 further comprising a cap, wherein the cap is formed with a diameter "D" equal to the diameter of the bottle.

4. An apparatus as recited in claim 3 wherein the cap is secured to the bottle by a thread on the cap and a groove on the bottle, wherein the thread is not continuous and has a plurality of breaks in the thread to allow the cap to be ejected when the bottle is dropped.

5. An apparatus as recited in claim 1 wherein the bolt hole channels are oval-shaped to allow for movement of the cage on the frame prior to insertion of the head end of the bolt to secure the cage to the frame.

6. An apparatus as recited in claim 1 further comprising an adapter plate, wherein the adapter plate is secured between the bicycle frame and the base plate to produce a snug fit between the bicycle frame and the cage.

7. An apparatus as recited in claim 1 wherein the bottle is formed with a plurality of dimples.

8. An apparatus as recited in claim 7 wherein the dimples are circular in shape.

9. An apparatus as recited in claim 7 wherein the dimples have a depth of 0.1 millimeters.

10. An apparatus as recited in claim 1 wherein the number of hemispheres is two, and wherein the first hemisphere and the second hemisphere are only joined at the base plate and separate when the bottle is inserted into the upper receiver.

11. An apparatus as recited in claim 1 wherein the cage, the upper receiver, the lip, and the toe tabs are formed with carbon fiber.

12. An apparatus as recited in claim 1 wherein the cage, the upper receiver, the lip, and the toe tabs are formed with metal.

13. An apparatus as recited in claim 1 wherein the cage, the upper receiver, the lip, and the toe tabs are formed with plastic.

14. An apparatus for use with a bicycle frame, wherein the apparatus comprises:
    a cage formed with a base plate extending the length of the cage, wherein the base plate has an upper end and a lower end, wherein the cage is formed from a series of wires that run parallel to each other, and wherein the series of wires extend away from the base plate;
    an upper receiver, wherein the upper receiver is connected to the base plate and extends in a direction away from the base plate, wherein the upper receiver is formed with a plurality of hemispheres;
    a cage heel having a proximal and a distal end, wherein the cage heel is formed on the upper receiver, and wherein the cage heel has a plurality of toe tabs at the distal end of the upper receiver;
    a lip extending away from the upper end of the base plate;
    a plurality of bolt hole channels, wherein the bolt hole channels are formed on the base plate between the upper end of the base plate and the lower end of the base plate to receive a plurality of bolts to secure the cage to the bicycle frame;
    a bottle, wherein the bottle has a diameter "D" of 64-73 millimeters, a height "h," a first end for insertion into the upper receiver and a second end formed with an indentation having a diameter less than "D," wherein the first end contacts the cage heel and the second end is secured to the cage by the lip; and
    an adapter plate, wherein the adapter plate is secured between the bicycle frame and the base plate to produce a snug fit between the bicycle frame and the cage;
    wherein with the bottle not inserted into the apparatus, at least one toe tab overlaps at least one other toe tab and, with the bottle inserted into the apparatus, the at least one toe tab does not overlap the at least one other toe tab.

15. An apparatus as recited in claim 14 further comprising a cap, wherein the cap is formed with a diameter "D" equal to the diameter of the bottle.

16. An apparatus as recited in claim 15 wherein the cap is secured to the bottle by a thread on the cap and a groove on the bottle, wherein the thread is not continuous and has a plurality of breaks to allow the cap to be ejected when the bottle is dropped.

17. An apparatus as recited in claim 15 wherein the bolts have a head end and a tail end, wherein the tail end is inserted into the bicycle frame and the head end has a flat head that lies flush with the base plate.

\* \* \* \* \*